United States Patent
Mashimo (10) Patent No.: US 7,483,353 B2
(45) Date of Patent: Jan. 27, 2009

(54) OPTICAL DISK DEVICE

(75) Inventor: Akira Mashimo, Tokorozawa (JP)

(73) Assignee: TEAC Corporation, Tama-shi (JP)

( * ) Notice: Subject to any disclaimer, the term of this patent is extended or adjusted under 35 U.S.C. 154(b) by 785 days.

(21) Appl. No.: 11/078,881

(22) Filed: Mar. 9, 2005

(65) Prior Publication Data

US 2005/0201231 A1    Sep. 15, 2005

(30) Foreign Application Priority Data

| Mar. 9, 2004 | (JP) | ............................. | 2004-065377 |
| Apr. 8, 2004 | (JP) | ............................. | 2004-114209 |
| Apr. 23, 2004 | (JP) | ............................. | 2004-127543 |
| Jul. 5, 2004 | (JP) | ............................. | 2004-198600 |

(51) Int. Cl.
  *G11B 20/10* (2006.01)
(52) U.S. Cl. ............... 369/47.28; 369/53.35; 369/59.23
(58) Field of Classification Search ............. 369/47.22, 369/47.26–47.28, 47.54, 59.19, 59.23, 53.35, 369/53.36, 53.19
See application file for complete search history.

(56) References Cited

U.S. PATENT DOCUMENTS

| 5,623,459 | A | 4/1997 | Iwamura | |
| 6,181,655 | B1 * | 1/2001 | Gushima | ................. 369/47.31 |
| 6,208,614 | B1 * | 3/2001 | Kim | ........................ 369/275.4 |
| 6,747,932 | B1 * | 6/2004 | Jeon | ........................ 369/53.24 |
| 6,765,972 | B1 | 7/2004 | Kawasaki | |
| 6,813,230 | B1 * | 11/2004 | Ko et al. | .................. 369/275.3 |
| 6,856,586 | B2 * | 2/2005 | Usui et al. | ............... 369/47.28 |
| 7,012,861 | B1 * | 3/2006 | Hong et al. | .............. 369/44.28 |

(Continued)

FOREIGN PATENT DOCUMENTS

JP    3290877    12/1991

(Continued)

OTHER PUBLICATIONS

"Next Generation DVD Specification HD DVD," Nikkei Electronics / Nikkei BP, Oct. 13, 2003, pp. 126-134 (with partial English translation).

(Continued)

*Primary Examiner*—Thang V Tran
(74) *Attorney, Agent, or Firm*—Christensen O'Connor Johnson Kindness PLLC (57) ABSTRACT

In an optical disk of HD-DVD, data is recorded in both grooves and lands. A groove track includes its own data region called a groove (G) track address system formed therein and a land track includes its own data region called a land (L) track address system formed therein. One bit of address data is composed of four redundant wobble waves. When only three or two of the four wobble waves can be detected, an error is determined. When an error is determined in tracing of a groove track, bit data of the L track address system is used to correct the error. When an error is determined in tracing of a land track, bit data of the G track address system is used to correct the error.

23 Claims, 7 Drawing Sheets

U.S. PATENT DOCUMENTS

| | | | |
|---|---|---|---|
| 7,088,651 B2 * | 8/2006 | Kim | 369/47.22 |
| 7,099,244 B2 * | 8/2006 | Nakata et al. | 369/47.19 |
| 7,292,522 B2 * | 11/2007 | Nagai et al. | 369/275.3 |
| 2003/0117915 A1 * | 6/2003 | Minamino et al. | 369/47.22 |
| 2003/0123350 A1 * | 7/2003 | Kim | 369/47.22 |

FOREIGN PATENT DOCUMENTS

| | | |
|---|---|---|
| JP | 7-169205 A | 7/1995 |
| JP | 2001-45083 A | 2/2001 |
| JP | 2004-71153 A | 3/2004 |

OTHER PUBLICATIONS

Decision of Final Rejection (JP) dated Mar. 18, 2008, issued in corresponding Japanese Application No. 2004-198600.

Nikkei Business Publications, Inc., "Essentials of Next Generation Optical Disk," Nikkei Electronic Books, Oct. 7, 2003, pp. 106-108.

* cited by examiner

OPTICAL DISK DEVICE

BACKGROUND OF THE INVENTION

1. Field of the Invention

The present invention relates to an optical disk device, and more particularly to a high-definition optical disk device which uses grooves and lands for data recording and reproducing.

2. Description of Related Art

HD (High-Definition) DVDs have been proposed in recent years as next generation DVDs. It is intended that the HD-DVDs adopt the disk structure of the current DVDs so as to ensure compatibility therewith, while simultaneously achieving higher density data recording than that of previous generation DVDs.

As one main feature, HD-DVDs adopt the land/groove recording method in which information is recorded in both lands and grooves. Land tracks and groove tracks are formed in wobbles, in which address information is embedded. More specifically, address information is expressed using phase modulation in such a manner that four waves having a phase of 0 degree represent "0" and four waves having a phase of 180 degrees represent "1". Here, a plurality of, in this case, four, waves having the identical phase (in-phase waves) are provided in order to increase the accuracy of address information detection by means of redundancy. For the address information to be embedded in the form of wobbles, binary data are converted into a gray code in which the distance between codes (inter-code distance) for adjacent sets of binary data, that is, the number of inverted bits, is equal to 1. Accordingly, in gray code, address "0" is represented as "00000000"; address "1" is represented as "00000001"; address "2" is repented as "00000011"; address "3" is represented as "00000010"; address "4" is represented as "00000110", and so on.

Figure 7:
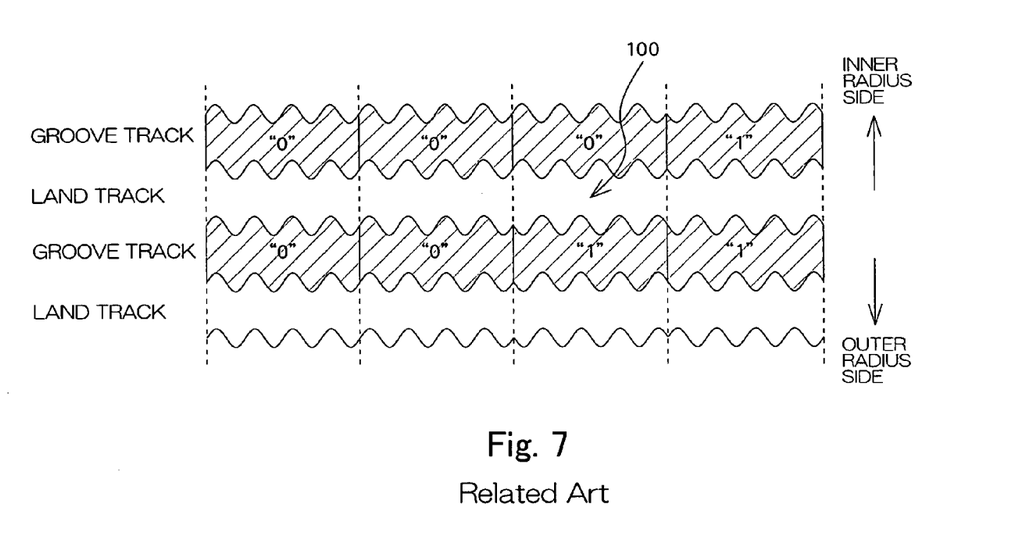
FIG. 7 is an explanatory view of wobble of an optical disk (HD-DVD)

Wobbles of an HD-DVD are shown schematically in FIG. 7. In one groove track, with a combination "0" represented by wobbles in a phase of 0 degrees both at the inner radius and the outer radius of the disk and "1" represented by wobbles in a phase of 180 degrees both at the inner radius and the outer radius of the disk, address information of "0001" is embedded. In the next groove track, address information of "0011" is embedded in a similar manner, with a combination of "0" and "1" represented by wobbles having phases of 0 and 180 degrees, respectively. In the land track disposed between these two groove tracks, however, wobbles at the inner radius and wobbles at the outer radius become out of phase with respect to each other at the inversed bit position of the contiguous groove track (the bit position 100 in FIG. 9), where a wobble signal cannot be specified.

In order to address the above problem, HD-DVDs include respective regions where the land track address and the groove track address are to be exclusively embedded. These regions are provided such that they are displaced from each other in the track direction, whereby the land track address and the groove track address are formed. When reading address information of a land track, the exclusive region for groove is skipped and the track address in the exclusive region for land that follows the exclusive groove region is read.

Figure 8:
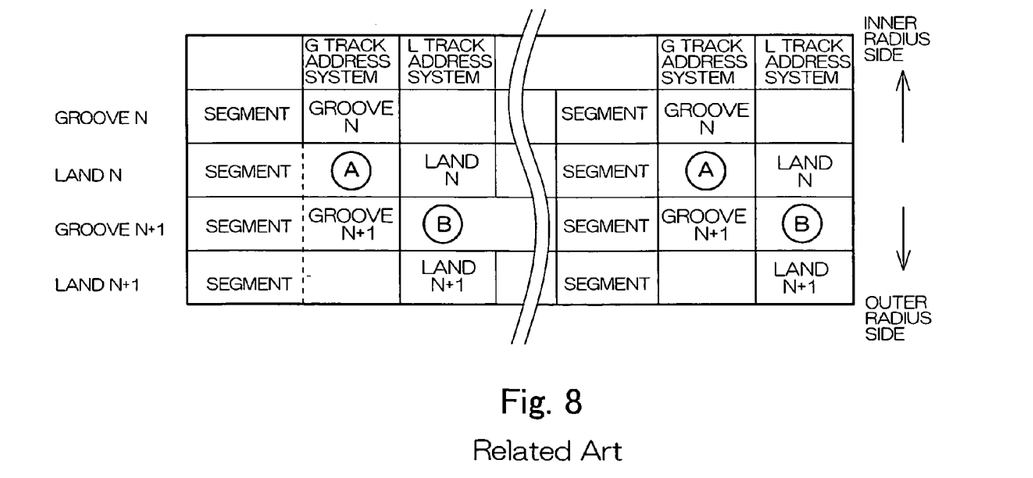
FIG. 8 is an explanatory view of track addresses of an optical disk (HD-DVD).

FIG. 8 schematically shows the address structure of an HD-DVD. Referring to FIG. 8, the exclusive regions for grooves and lands are indicated as "G track address systems" and "L track address systems", respectively. Each of the groove tracks and the land tracks is divided into a plurality of segments in the track direction. The segment addresses are sequentially assigned for each track along the whole circumference of the disk and are then reset for the following track. Consequently, segment 1 of Groove N is adjacent to segment 1 of Land N, which is then adjacent to segment 1 of Groove N+1.

In the G track address system of groove N, address "N" is embedded only with wobbles which are in phase with each other (in-phase wobbles), and in the L track address system of the adjacent land N, address "N" is embedded only with in-phase wobbles. Thus, when tracing the groove track N (groove N), the segment and a wobble signal in the G track address system are reproduced. When tracing the land track N (land N), after reading the segment, the G track address system is skipped and a wobble signal in the L track address system is reproduced, thereby obtaining address information. The address structure for HD-DVDs is disclosed in, for example, "Nikkei Electronics, Oct. 13, 2003" (Nikkei BP, Oct. 13, 2003, pp. 126-134).

As described above, the address information is expressed by means of phase modulation in such a manner that four waves having a phase of 0 degrees represent a bit value "0" and four waves having a phase of 180 degrees represent a bit value of "1", and the bit value of "0" or "1" can be determined basically according to the principle of majority rule. More specifically, when three waves having a phase of 0 degrees and only one wave having a phase of 180 degrees are detected, such wobbles can be determined to be "0". However, even when three waves having a phase of 0 degrees are detected, there is no guaranteeing that the bit data is truly "0". It is therefore desirable to further increase the detection accuracy. Further, when two waves having a phase of 0 degrees and two waves having a phase of 180 degrees are detected, i.e. when a half of the four waves represent 0 and the other half of the four waves represent 1, it is not possible to determine which of the data 0 or 1 is represented by such wobbles.

SUMMARY OF THE INVENTION

The present invention provides an optical disk device capable of increasing accuracy of detecting (or demodulating) address information when performing data recording and reproducing with respect to an optical disk in which the address information is embedded using phase modulation in such a manner that four in-phase waves represent data "0" or "1".

In accordance with one aspect of the present invention, there is provided an optical disk device for recording or reproducing data with respect to grooves and lands of an optical disk in which address information is embedded by forming the grooves and the lands in wobbles, the address information being embedded after conversion into a gray code in which a distance between codes for two consecutive address values is equal to 1, in which the wobbles form data of a single bit by N in-phase waves, the optical disk device comprising means for reproducing the wobbles; means for counting the number of in-phase waves detected from the reproduced wobbles; and address determination means for confirming, when the number of in-phase waves of the wobbles is N/2+1 or greater, bit data in accordance with the phase and for determining a reading error and performing a predetermined error process when the number of in-phase waves of the wobbles is N/2. Here, N is 4, for example.

In accordance with another aspect of the present invention, there is provided an optical disk device for recording of reproducing data with respect to grooves and lands of an optical disk in which address information is embedded by forming the grooves and the lands in wobbles, the address information being embedded after conversion into a gray code in which a distance between codes for two consecutive address values is equal to 1, in which the wobbles form data of a single bit by N in-phase waves, the optical disk device comprising means for reproducing the wobbles; means for counting the number of in-phase waves detected from the reproduced wobbles; and address determination means for confirming, when the number of in-phase waves of the wobbles is N, bit data in accordance with the phase and for determining a reading error and performing a predetermined error process when the number of in-phase waves of the wobbles is N−1 or less. Here, N is 4, for example.

According to another aspect of the present invention, the predetermined error process is performed such that, when the address information includes a parity bit, an error bit is corrected so that the parity check using the parity bit is made correct. In HD-DVDs, tracks are divided into a plurality of segments as shown in FIG. 8, and a parity bit is added to the segment information section. Therefore, parity checking is performed when an error is determined, and if the parity check is not correct (i.e. when one error is generated), a bit which has been determined to be an error is corrected so as to make the parity correct, whereby correct address information can be obtained.

Further, according to another aspect of the present invention, at the time of tracing the groove track, the address information obtained from a wobble signal generated by reproducing the land track address system is used to correct an error, and at the time of tracing the land track, the address information obtained from a wobble signal generated by reproducing the groove track address system is used to correct an error. In HD-DVDs, the groove track includes the G track address systems and the L track address systems formed therein, as shown in FIG. 8. Although the address information of the L track address system is undetermined at one bit position because opposite-phase wobbles are included therein, the address information of the L track address system corresponds to the address information of the G track address system at other bit positions because the address information is embedded in both the G track address system and the L track address system after being converted into gray code. Accordingly, such correspondence between the two systems are used to correct a reading error generated in the address information of the G track address system. More specifically, when a reading error is caused in the address information of the G track address system, the error bit is replaced by bit data at the bit position of the address information of the L track address system corresponding to the error bit position, thereby correcting the error. Here, at the time of tracing a groove track or at the time of tracing a land track, of a bit of the G track address system and a bit of the L track address system, a bit which includes less error may be determined to be bit data for the address.

The present invention will be understood more clearly with reference to the embodiment detailed below. It is to be appreciated, however, that the scope of the present invention is not limited to the described embodiment.

BRIEF DESCRIPTION OF THE DRAWINGS

A preferred embodiment of the present invention will be described in further detail based on the following drawings, wherein.

DETAILED DESCRIPTION OF PREFERRED EMBODIMENT

A preferred embodiment of the present invention will be described in detail with reference to the accompanying drawings.

Figure 1:
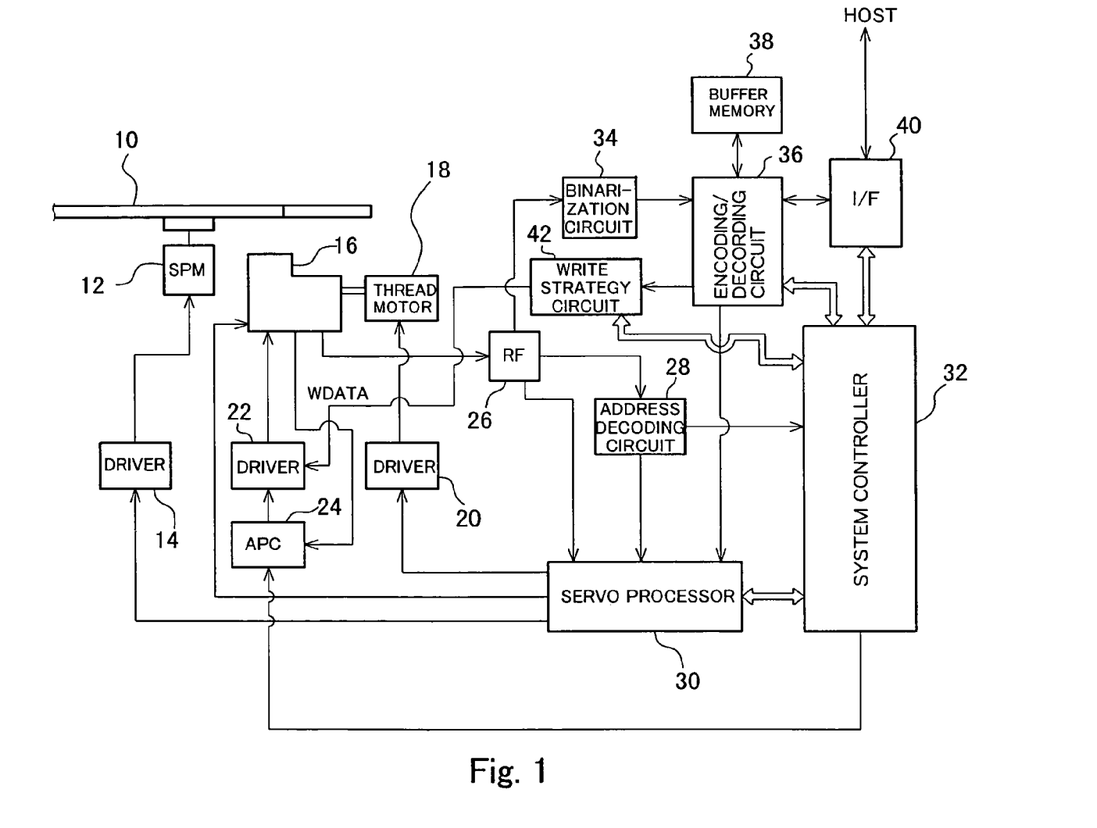
FIG. 1 is a diagram showing the overall structure of an optical disk device according to one embodiment of the present invention.

FIG. 1 shows the overall structure of an optical disk device according to the present embodiment. An optical disk 10 is rotated by a spindle motor (SPM) 12. The spindle motor SPM 12 is in turn driven by a driver 14, which, in turn, is servo-controlled by a servo processor 30 so as to operate at a desired rotation rate. In the example used to illustrate the present embodiment, the driver 14 divides the optical disk 10 into a plurality of zones from the inner radius to the outer radius, and drives the spindle motor SPM so as to achieve a constant angular velocity in each zone (ZCAV).

An optical pickup 16, which includes a laser diode (LD) for irradiating laser light onto the optical disk 10 and a photo detector (PD) for receiving and converting light reflected from the optical disk 10 into an electric signal, is disposed opposite the optical disk 10. The optical pickup 16 is driven by a thread motor 18 in the radial direction of the optical disk 10. The thread motor 18 is driven by a driver 20, which is servo-controlled by the servo processor 30 in the same manner as the driver 14. Further, the LD of the optical pick-up 16 is driven by the driver 22, which is controlled by an auto power control circuit (APC) 24 such that a drive current assumes a desired value. Specifically, the APC 24 controls the drive current of the driver 22 such that it becomes the optimum recording power selected by OPC (Optimum Power Control) which is performed in a test area (PCA) of the optical disk 10. The OPC is a process in which test data is recorded on the PCA of the optical disk 10 while changing the recording power stepwise, and then the test data is reproduced for evaluation of the signal quality, so that the recording power with which the desirable signal quality can be obtained is selected. As an index of signal quality, a β value and a γ value, a degree of modulation, jitter, or the like is used.

When reproducing the data recorded on the optical disk 10, laser light of reproduction power is emitted from the LD of the optical pickup 16, and the light reflected on the disk is converted into an electrical signal by the PD and output. A reproduction signal from the optical pickup 16 is supplied to an RF circuit 26, which generates a focus error signal and a tracking error signal from the reproduction signal and supplies these signals to the servo processor 30. The servo processor 30 servo controls the optical pickup 16 based on these error signals and retains the optical pickup 16 in the on-focus and on-track conditions.

The optical pickup 16 performs recording and reproduction with respect to grooves and lands of the optical disk 10. The grooves are formed helically on the optical disk 10. Data is recorded and reproduced with regard to the grooves and lands alternately, in the sequence of groove 1→land 1→groove 2→land 2→groove 3→land 3→ . . . , for example. Alternatively, it is also possible that, for each zone, recording and reproduction be performed with respect to all the grooves within the zone, and that recording and reproduction then be performed with respect to all the lands within the same zone. Thus, for each zone, recording and reproduction is performed with respect to the lands after recording and reproduction is performed with respect to the grooves. Further, the RF circuit 26 supplies an address signal (a wobble signal) contained in the reproduction signal to an address decoding circuit 28. The address decoding circuit 28 demodulates the address signal to obtain address data of the optical disk 10, and supplies the demodulation data to the servo processor 30 and a system controller 32. The address data is embedded in the grooves and lands of the optical disk 10 in the form of wobbles. The optical disk 10 includes a segment address and a track address as the address data. The address data has been subjected to phase modulation such that four waves having a phase of 0 degrees represent "0" and four waves having a phase of 180 degrees represent "1", and is formed in the optical disk 10 in a gray code.

The address format of the optical disk 10 is composed of two address systems, as described above. One of the address systems, hereafter referred to as a "groove (G) track address system", detects a groove track address exclusively, while the other address system detects a land track address exclusively (which system will therefore be referred to as "land (L) track address system"). Both the G track address system and the L track address system are formed in groove tracks along the track direction. Similarly, both the G track address system and the L track address system are formed in land tracks along the track direction. The address can be detected from a wobble signal contained in a reproduced signal in the G track address system of the groove track and in the L track address system of the land track where wobbles are always adjusted in phase with each other.

The RF circuit 26 supplies a reproduction RF signal to a binarization circuit 34. The binarization circuit 34 binarizes (digitizes as binary data) the reproduced signal and supplies the resulting signal to an encode/decode circuit 36. The binary signal is then subjected to demodulation and error correction in the encode/decode circuit 36 to obtain reproduction data, which is output to a host device, such as a personal computer, via an interface I/F 40. Here, the encode/decode circuit 36 temporarily stores the reproduction data in a buffer memory 38 before outputting the reproduction data to the host device.

On the other hand, for recording data onto the optical disk 10, data to be recorded is supplied from the host device to the encode/decode circuit 36 via the interface I/F 40. The encode/decode circuit 36 stores the data to be recorded in the buffer memory 38, and then encodes and supplies the data to be recorded, as modulation data (ETM (Eight to Twelve Modulation) data), to a write strategy circuit 42. The write strategy circuit 42 converts the modulation data into multi-pulses (a pulse train) in accordance with a predetermined recording strategy, and supplies the multi-pulses, as recording data, to the driver 22. The recording strategy is constituted by pulse widths of a leading pulse or subsequent pulses in multi-pulses and the pulse duty, for example. The recording strategy, which affects recording quality, is generally fixed to a certain optimum strategy, and may be set during optimum power control (OPC). Then, the laser light whose power was modulated according to the recording data is emitted from the LD of the optical pickup 16 onto the optical disk 10 for recording the data. After the data is recorded as described above, the optical pickup 16 emits laser light of reproducing power so as to reproduce the recorded data, and outputs the reproduced data to the RF circuit 26. The RF circuit 26 supplies the reproduction signal to the binarization circuit 34 where the data is binarized and supplied to the encode/decode circuit 36. The encode/decode circuit 36 decodes the modulation data and verifies the thus-decoded data against the recording data stored in the buffer memory 38. The result of verification is supplied to the system controller 32, which determines, in accordance with the verification result, whether to continue data recording or perform alternation operation.

With the structure as described above, when, in order to record or reproduce data with respect to the grooves, a groove track is traced and the address information detected by the address decoding circuit 28 is supplied to the system controller 32, four consecutive in-phase waves can be detected when the data reading is performed correctly, and the bit value can be determined to be "0" or "1" in accordance with the detected phase. However, when only three or two in-phase waves are detected, there is a possibility that a reading error has been occurred. Here, when only three in-phase waves are detected, although the bit value can be determined in accordance with the detected phase based on the principle of majority rule, the reliability of the information is relatively low. When only two in-phase waves are detected, it is not even possible to determine the bit value based on the principle of majority rule.

To deal with the above problem, according to the present embodiment, it is only determined that the reading is correct when four in-phase waves are detected and, in all other case, a predetermined error process is performed. Reliability of the address information is thereby secured.

Figure 2:
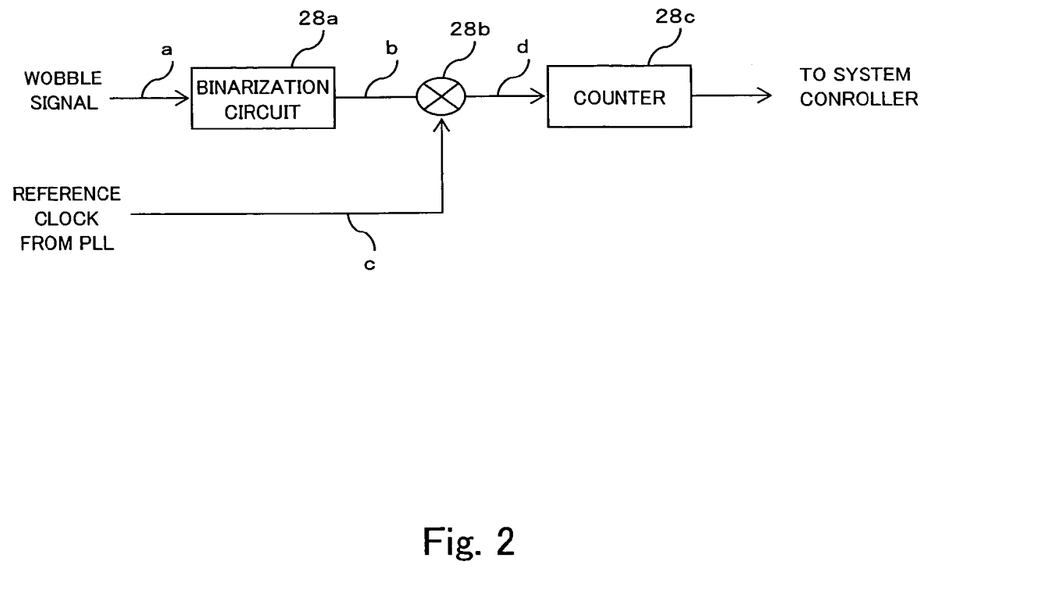
FIG. 2 is a diagram showing a structure of an address decoding circuit according to the embodiment of the present invention.
Figure 3:
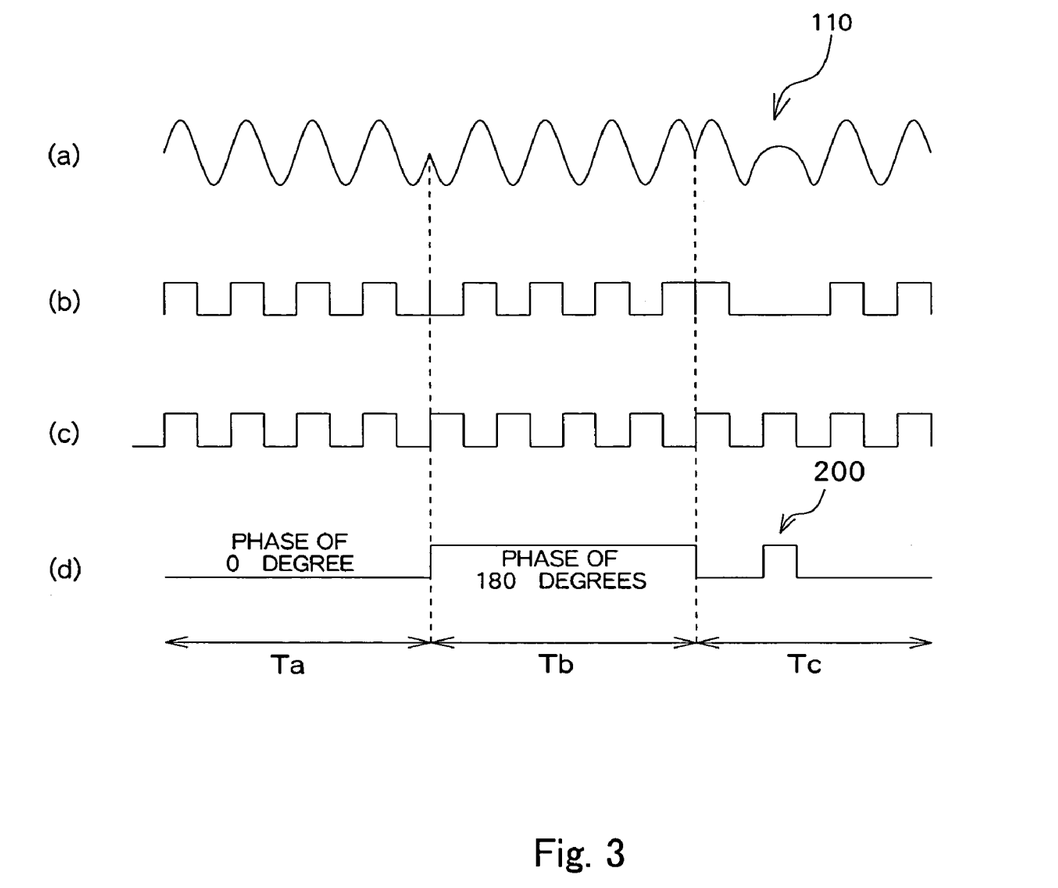
FIG. 3 is a timing chart of a wobble signal.

FIG. 2 shows a counting circuit for counting the number of in-phase waves, in the address decoding circuit 28. FIG. 3 shows a timing chart with respect to each part shown in FIG. 2. The counting circuit is composed including a binarizer 28a for binarizing a wobble signal extracted from an RF signal, an Exclusive-OR (EOR) gate 28b, and a counter 28c.

The binarizer 28a binarizes a wobble signal which is input and outputs a binarized signal. FIG. 3(a) shows an input wobble signal, and FIG. 3(b) shows a binarized wobble signal, which is to be supplied to the EOR gate 28b. On the other hand, a reference clock signal from a PLL circuit (not shown) is also supplied to the EOR gate 28b. FIG. 3(c) shows a reference clock signal.

The EOR gate 28 performs an Exclusive-OR operation with respect to the binarized wobble signal and the reference clock signal thus supplied, and outputs the resulting signal to the counter 28c. FIG. 3(d) shows an output signal. When both the binarized wobble signal and the reference clock signal are at H or L level, the output signal is at L level. When one of the binarized wobble signal and the reference clock signal is at H level and the other is at L level, the output signal is at H level. Accordingly, when wobbles are read correctly during the period Ta (corresponding to one bit data length of the address information), the binarized wobble signal includes four pulses at H level and is continuously of the identical value with the reference clock signal, thereby continuously providing an output signal at L level. Consequently, the counter 28c counts the number of pulses 0, determining that the number of in-phase waves of 0 degrees is four. Further, when wobbles are also read correctly during the period Tb, the binarized wobble signal includes four pulses at L level and is continuously has a different value from the reference clock signal, thereby continuously providing an output signal at H level. Consequently, the counter 28c counts the number of pulses 0, namely detects that the number of in-phase waves of 180 degrees is four. However, if an error occurs in reading wobbles so that the second wave 110 of four waves cannot be detected during the period Tc of FIG. 3, the binarized wobble signal includes only three pulses at H level and has a different value from the reference clock signal at this undetected data portion, thereby proving an output signal including one pulse 200. Consequently, the counter 28c counts the number of pulses 1, namely detects that the number of in-phase waves of 0 degrees is three. In this manner, the number of in-phase waves is counted and the result is supplied to the system controller 32.

An error operation which is performed by the system controller 32 when the number of detected in-phase waves is two or three will be described.

Figure 4:
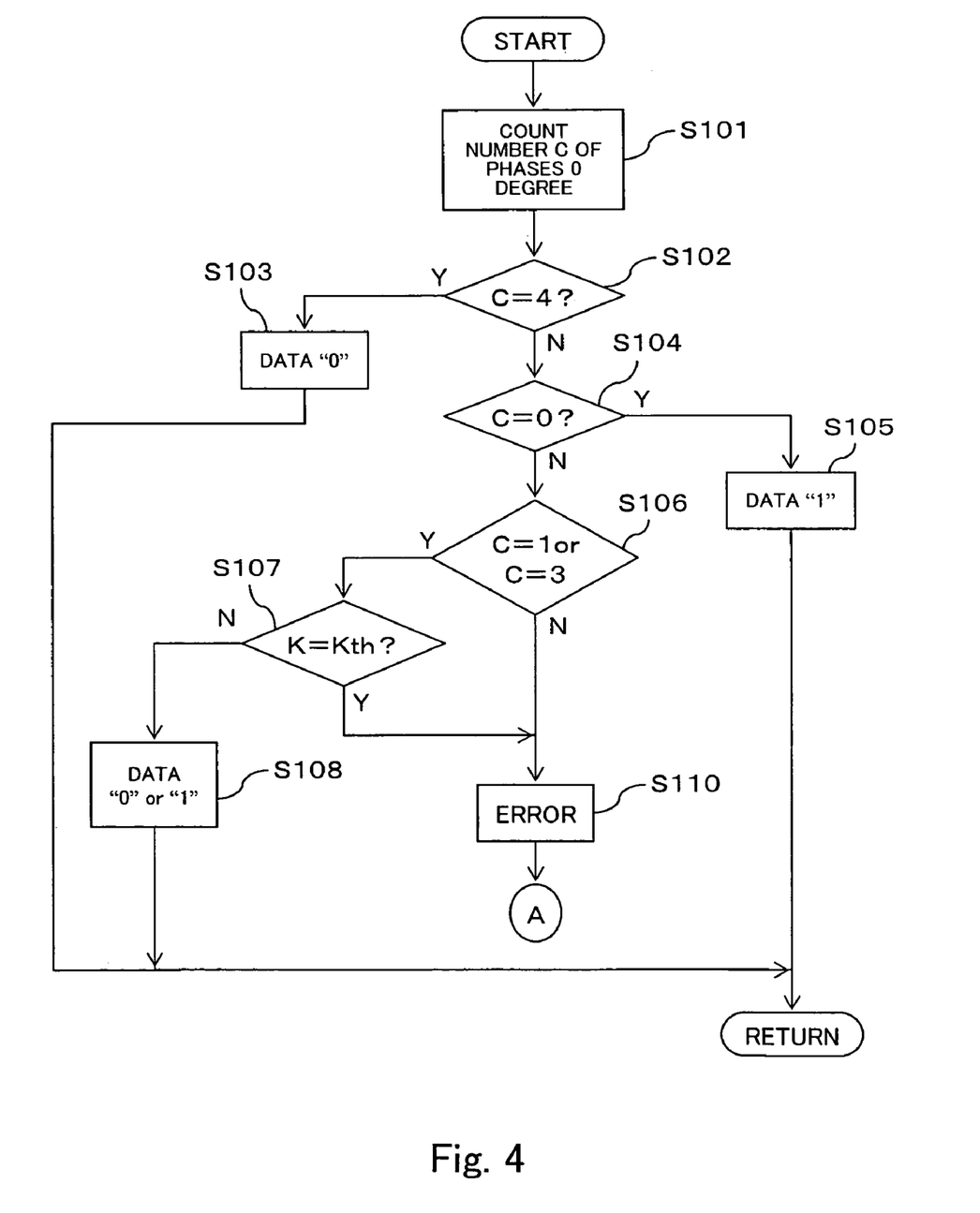
FIG. 4 is a flowchart of a whole process according to the embodiment of the present invention.

FIG. 4 shows a flowchart of an address information decoding process according to the present embodiment. First, the number C of waves having a phase of 0 degrees is counted by the counter 28c (S101). Then, the system controller 32 determines whether or not a relationship of C=4 is fulfilled, namely whether or not the number of waves is four (S102). If the number of waves is four, the bit value is determined to be "0" (S103).

If the relationship of C=4 is not established, it is then determined whether or not a relationship of C=0 is established, namely whether or not the number of waves is zero (in other words, whether or not the number of waves having a phase of 180 degrees is four) (S104). When the number of waves is zero, the bit value is determined to be "1" (S105).

When the relationship C=0 is not established at step S104, on the other hand, it is then determined whether or not C=1 or C=3 is established (S106). When C=1 or C=3 is established, although, in accordance with the majority rule, the bit value can be determined to be "1" or "0", respectively, the reliability of the information is problematic. Therefore, the number K of bits in the address information in which C=1 or C=3 is established is counted, and it is then determined whether or not the bit number K reaches a threshold value Kth (S107). When the address information is represented by 12-bit gray code, for example, the value of Kth is set to 3. Then, when the bit number K has not reached Kth yet, it is considered that reliability of the address information is secured, and the bit value "1" or "0" is therefore determined (S108). Specifically, in the case of C=1, the bit value "1" is determined, and in the case of C=3, the bit value "0" is determined. On the contrary, when the bit number K reaches the threshold value Kth, i.e. when, assuming the threshold value Kth of 3, C=1 or C=3 is established in three bits of twelve bits in address information, reliability of the address information is considered to be low and an error is determined (S110). Here, the threshold value Kth can be arbitrarily set. When Kth is set to 1, for example, an error is determined if there is at least one bit in which the number of in-phase waves is not four. Further, in the case of C=2 for which the majority rule is not applicable, NO is selected at S106 and an error is determined (S110). When an error is determined, the system controller 32 proceeds to an error operation as will be described below, namely a correction process of the address information (S203).

Figure 5:
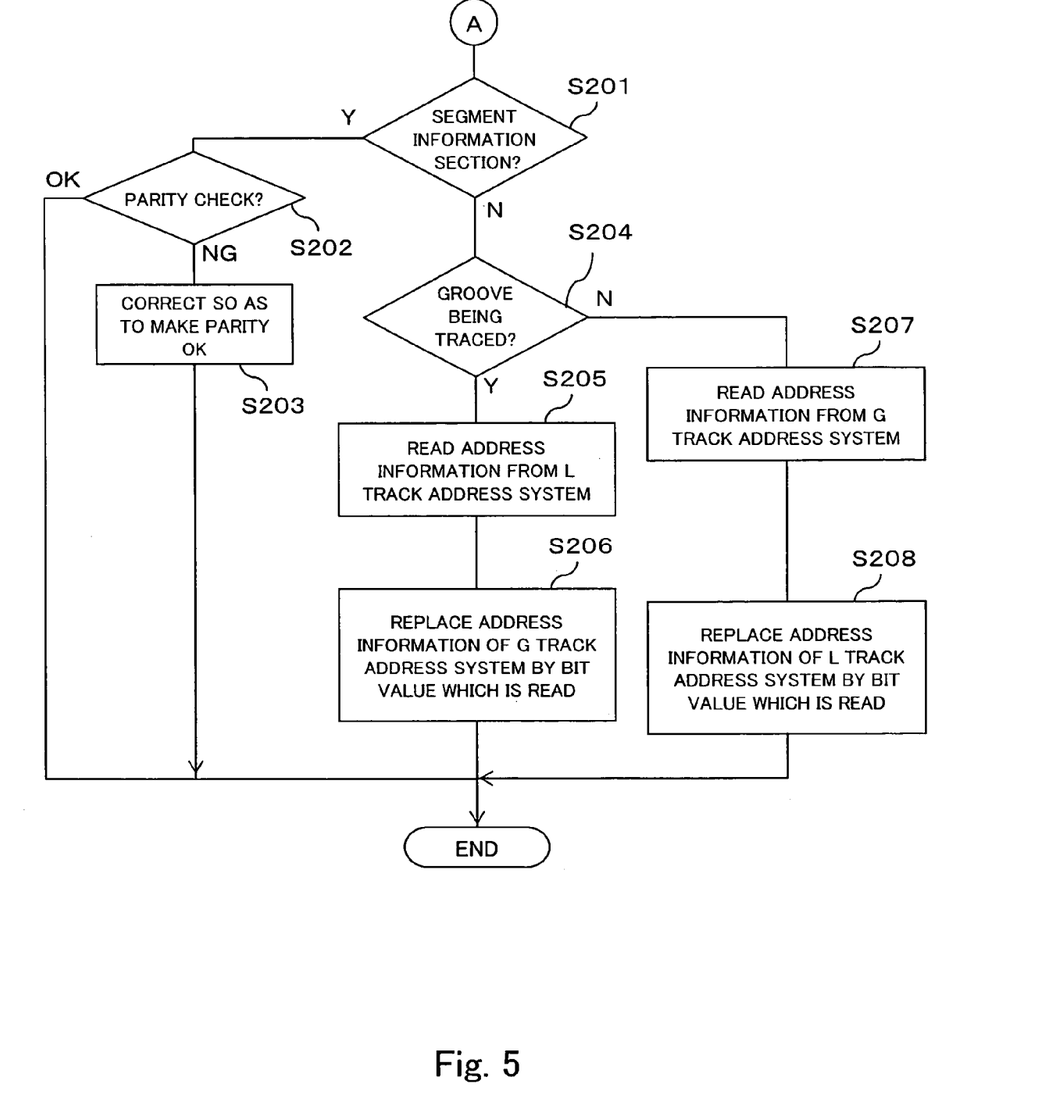
FIG. 5 is a flowchart of an error process according to the embodiment of the present invention.

FIG. 5 shows a flowchart of an error process performed by the system controller 32. It is first determined whether or not the region which is being traced is a segment information section (S201). This determination is made because a segment information section includes a parity bit, which can be used for the error correction. If it is determined that the section is a segment information section, the parity bit is used to perform parity check CK with regard to the address information which has been read (S202). When the parity is not correct and NG is determined, it is considered that the bit which has been determined as an error bit in the above process includes an error, and this error bit is corrected such that the parity is made correct.

More specifically, with regard to the address information which has been determined as an error due to detection of C=2, is it considered that the parity is incorrect because the bit for which C=2 is determined includes an error, and therefore this bit is corrected to "0" or "1" to correct the parity. Similarly, with regard to the address information in which the number K of bits for which C=1 or C=3 is determined exceeds the threshold Kth, it is considered that the parity is incorrect because these bits include an error, and therefore these bits are corrected to "0" or "1" such that the parity is made correct. This error process requires that the threshold value Kth be set to 1, so that, when an error is detected in at least one bit, error correction is made such that the parity is made correct. Here, the threshold value Kth is limited to 1 because, if the threshold value Kth is set to another value such as 2, for example, there is a possibility that the address information includes an even number of error bits, which cannot detected by the parity check. With the above process, with regard to the segment information section, error correction is performed for any bit at which four in-phase waves are not detected, thereby obtaining the segment information. Here, the error correction using a party may be limited to the case of C=2. Further, in a case where the parity is not correct and then a plurality of error bits are specified, of these specified bits, the bit with the highest degree of error (i.e., a bit for which C=2 is detected in this embodiment) may be considered to include a phase error and only this bit may be corrected.

On the other hand, when the region which is being traced is not a segment information region, error correction using a parity cannot be performed because a parity bit is not added. Accordingly, error correction is performed as follows.

It is now assumed that a groove is traced. A groove track includes G track address systems and L track address systems (see FIG. 8). When tracing a groove, the address information is demodulated from the G track address system, and the address information is also demodulated from the L track address system which includes opposite-phase wobbles and essentially provides undetermined information. While the address information which is read from the L track address system is undetermined, because the address information is coded in a gray code in which an inter-code distance is equal to 1, the address information which is read should have a value of the track address adjacent thereto on either side. Specifically, the address information which is obtained from the L track address system differs from the address information obtained from the G track address system by only one bit and the address information obtained from the L track address system is of the same value as the address information obtained from the G track address system for other bits. This means that it is possible to compare the address information obtained by demodulation of the G track address system and the address information obtained by demodulation of the L track address system and replace an error bit of the address information obtained from the G track address system by a corresponding bit of the address information obtained from the L track address system. For example, when C=2 is determined for the second bit of the address information obtained from the G track address system, this error bit can be replaced by the second bit value of the address information obtained from the L track address system to thereby determine "0" or "1". It is of course not possible to perform such replacement when the error bit position in the address information obtained from the G track address system corresponds to the bit position in the address information obtained from the L track address system which includes opposite-phase wobbles and provides undetermined data. Accordingly, correction by replacement of an error bit as described above is effective only when the error bit position in the address information of the G track address system differs from the bit position in the address information of the L track address system which includes opposite-phase wobbles and thus provides undetermined data. The error correction as described above is similarly applicable when tracing a land track.

Based on the above-described principle, determining that the region which is currently being traced is not a segment information section ("NO" at step S201), the system controller 32 then determines whether or not a groove is being traced, in accordance with the polarity of the tracking servo and so on (S204). Then, if a groove is being traced, the address information is subsequently read from the L track address system and the number of in-phase waves is counted as in the case of the G track address system (S205). When the number C of waves of the L track address system proves C=4 or C=0 at the bit position corresponding to the error bit position of the G track address system, the error bit is replaced by the bit value of the L track address system (S206). For example, when C=2 is determined for the second bit of the address information of the G track address system and C=4 is determined for the second bit of the address information of the L track address system, the second bit of the G track address system is replaced by "0", thereby correcting the error. Further, when C=2 is determined for the second bit of the address information of the G track address system and C=0 is determined for the second bit of the address information of the L track address system, the second bit of the G track address system is replaced by "1", thereby correcting the error. In addition, when C=1 is determined for the second bit and the third bit of the address information of the G track address system and C=4 is determined for the second bit and the third bit of the address information of the L track address system, the second bit and the third bit of the G track address system are replaced by "0", thereby correcting the error (if Kth=2).

When C=2 is determined for the second bit of the address information of the G track address system and C=2 is also determined for the second bit of the address information of the L track address system, the second bit of the G track address system cannot be replaced and therefore error correction is not performed. Further, when C=2 is determined for the second bit of the address information of the G track address system and C=3 is determined for the second bit of the address information of the L track address system, the second bit of the G track address system is replaced by "0", thereby correcting the error. Such error correction, however, may be omitted because reliability of the address information is low.

The error correction as described above will be descried more specifically.

Figure 6:
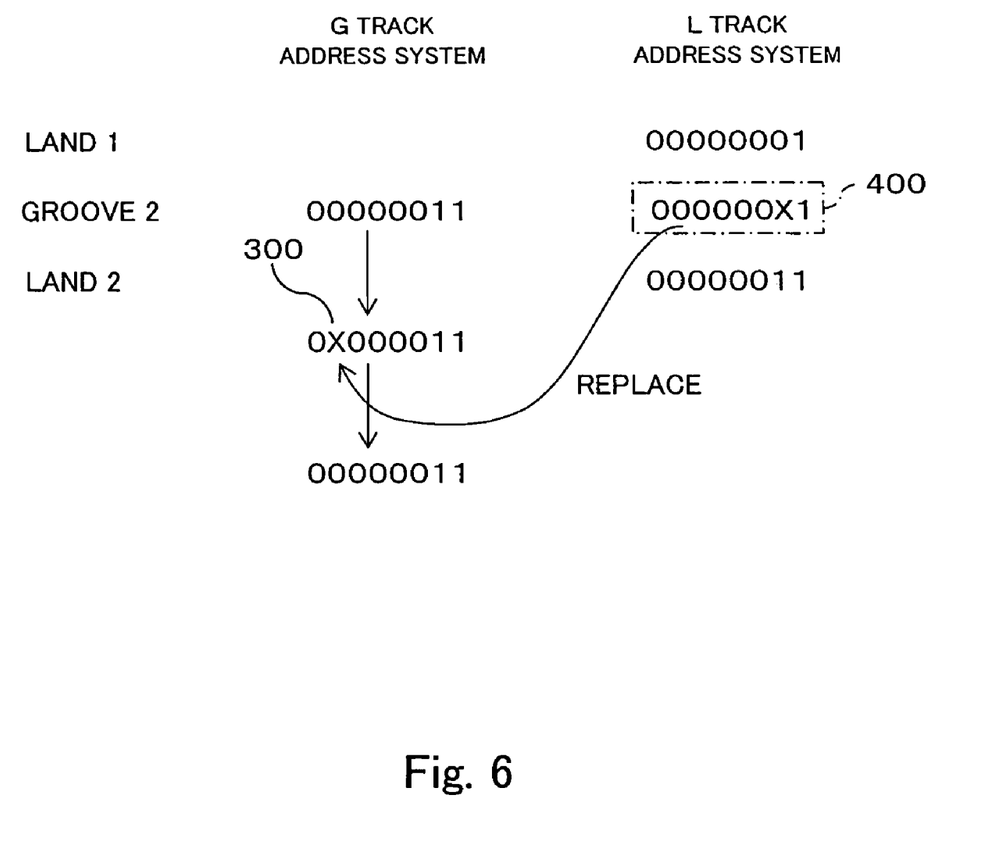
FIG. 6 is an explanatory view of the error process.

FIG. 6 shows addresses of the G track address system and the L track address system when the tracks are formed in the sequence of groove 1, land 1, groove 2, land 2, . . . from the inner radius to the outer radius of a disk. For the convenience of explanation, the address is represented by 8-bit gray code. Specifically, the address "00000001" is embedded in the L track address system of land 1 in the form of wobbles; the address "00000011" is embedded in the G track address system of groove 2 in the form of wobbles; and the address "00000011" is embedded in the L track address system of land 2 in the form of wobbles. It is now assumed that groove 2 is being traced for reading the address information of the G track address system. Each bit of the address information is formed by four in-phase waves, and therefore the address should be read as "00000011" if the G track address system is correctly read. However, reading error is determined if C=2 is detected for the seventh bit, i.e., if only two waves having a phase of 0 degrees are detected for the seventh bit. In FIG. 6, the mark "X" designated by numeral 300 indicates an error bit generated in the address information of groove 2.

On the other hand, in groove 2, the L track address system 400 is formed subsequent to the G track address system. This L track address system 400 is formed by the L track address system of land 1 and the L track address system of land 2. Because the L track address system of land 1 is "00000001" and the L track address system of land 2 is "00000011", the L track address system 400 is read as "000000X1", in which "X" at the second bit indicates that data cannot be reproduced due to inclusion of opposite-phase wobbles. Thus, although the L track address system 400 of groove 2 includes an undetermined bit, the L track address system 400 has the same bit values as the G track address system of groove 2 at other bit positions. Accordingly, by replacing the error bit "X" generated at the seventh bit of the G track address system by the bit data "0" at the corresponding seventh bit of the L track address system 400, an accurate address information "00000011" can be obtained.

Similarly, when tracing a land track, the address information of the G track address system is read and the number of in-phase waves of the address information is counted as in the case of the L track address system (S207). Then, if the number of waves of the G track address system at a bit position corresponding to the error bit position of the L track address system proves C=0 or C=4, the error bit is replaced by the bit value of the G track address system (S208). For example, when C=2 is determined for the second bit of the address information of the L track address system and C=4 is determined for the second bit of the address information of the G track address system, the second bit of the L track address system is replaced by "0", thereby correcting the error. Further, when C=2 is determined for the second bit of the address information of the L track address system and C=0 is determined for the second bit of the address information of the G track address system, the second bit of the L track address system is replaced by "1", thereby correcting the error. When C=1 is determined for the second bit and the third bit of the address information of the L track address system and C=4 is determined for the second bit and the third bit of the address information of the G track address system, the second bit and the third bit of the L track address system are replaced by "0", thereby correcting the error. Further, when C=2 is determined for the second bit of the address information of the L track address system and C=2 is also determined for the second bit of the address information of the G track address system, the second bit of the L track address system cannot be replaced and therefore error correction is not performed.

As described above, when tracing a groove, of the address information read from the G track address system, a bit for which C=2 is determined or a bit for which C=1 or 3 is determined is replaced by the corresponding bit of the address information read from the L track address system which is formed in the same track as the G track address system, whereby correction of an error bit is performed. When tracing a land, of the address information read from the L track address system, a bit for which C=2 is determined or a bit for which C=1 or 3 is determined is replaced by the corresponding bit of the address information read from the G track address system which is formed in the same track as the L track address system, whereby correction of an error bit is performed.

In the present embodiment, when the number C of in-phase waves is C=1 or C=3, an error is determined if the number of such bits in the address information is a threshold value Kth or more. It is also possible, however, that successful reading is determined only when C=0 or C=4 is established and that a reading error is equally determined for each case of C=1, 2, or 3 and the process then proceeds to the error correction shown in FIG. 5.

Alternatively, in the present embodiment, it is also possible to set the threshold value Kth to a sufficiently great value so that successful reading is substantially determined in the case of C=1 or 3, and to determine reading error only in the case of C=2, and then proceed to the error process shown in FIG. 5. In this case, the bit value is determined based on the majority rule, and an error is determined and an error correction is performed only when such determination based on the majority rule is not possible.

Further, in the present embodiment, the number of pulses contained in the output signal supplied from the EOR gate 28b in FIG. 2 is counted. In the case of determination of a bit value based on the majority rule, it is also possible to measure the length of time of the L level and the H level for each period of the output signal, Ta, Tb, and Tc, and determine the phase, namely the bit value, of the period by the level of the longer length of time. For example, in the period of Ta, as the time length of H level is 0, the phase is 0 degrees and the bit value "0" can therefore be determined; in the period of Tb, as the time length of L level is 0, the phase is 180 degrees and the bit value "1" can therefore be determined; and in the period of Tc, as the time length of L level is longer than that of the H level, the bit value "0" can be determined. The case where the time length of L level is about the same as that of H level substantially corresponds to the case of C=2, and therefore an error is determined. Here, it is also possible to determine either C=1, 2, or 3 in accordance with the different in the time length between L level and H level. Further, in the above example, one bit data of the address information is composed of four phase waves. However, the present invention is not limited to such a structure and is also applicable to an optical disk and an optical disk device having address information which is formed by the number of phase waves for which the bit value cannot be determined based on the principle of majority rule. In this case, it is of course necessary to change the condition for determination based on the number C of waves having the same phase, in accordance with the number of phase waves forming the bit data.

In addition, in the present embodiment, when a reading error occurs in the address information of the G track address system during tracing of a groove track, such an error bit is replaced by bit data of the address information of the L track address system at the bit position corresponding to the error bit. However, it is also possible to compare the number C of in-phase waves of each bit of the G track address system and that of the L track address system and adopt the bit with less errors (i.e., the bit for which the number of in-phase waves is greater).

More specifically, in the process shown in FIG. 5, when the address information is read from the L track address system at S205 and the address information which is thus read is used to replace the address information of the G track address system at S206, the number C of in-phase waves of the L track address system is counted and compared to the number C of in-phase waves of the G track address system. Of the bits which are compared, the bit for which the number C of waves is zero or four or is closer to zero or four is adopted. For example, when the number C of waves of the G track address system for a certain bit is two and the number C of waves of the L track address system for the corresponding bit is zero or one, the bit value of the L track address system is adopted and the data "0" is determined for the bit. Further, when the number C of waves of the G track address system is two and the number C of waves of the L track address system is three or four, the bit value of the L track address system is adopted and the data "1" is determined.

When the number of waves of the G track address system is one or three, on the other hand, the bit value can be selected according to the similar comparison. Specifically, when the number C of waves of the G track address system is one and the number C of waves at the corresponding bit position of the L track address system is zero, the bit of the L track address system is adopted and data "0" is determined. Further, when the number C of waves of the G track address system is three and the number C of waves at the corresponding bit position of the L track address system is four, the bit of the L track address system is adopted and data "1" is determined.

Similarly, when tracing the land track address, the number of in-phase waves of the L track address system and the number of in-phase waves of the G track address system are compared and the bit for which the number of reading errors is less is adopted. For example, when the number C of waves of the L track address system is one and the number C of waves of the G track address system is zero, the bit of the G track address system is adopted and the data "0" is determined. In summary, when tracing a groove track or when tracing a land track, both the G track address system and the L track address system are reproduced and the number of in-phase waves are compared for each bit between the G and L track address systems. Then, the bit for which the number of in-phase waves is greater than the other can be determined as bit data of the address information.

Consequently, in the case where the address data is formed by twelve bits, when reading a certain track address, the address information may be formed by mixture of the bit of the G track address system and the bit of the L track address system, such as, for example, the least significant bit from the G track address system, the second bit from the L track address system, the third bit from the G track address system, and so on.

Here, when the G track address system and the L track address system have the same level of error at the corresponding bit positions, either bit may be selected in accordance with a predetermined rule. For example, it is possible that priority is given to the G track address system when tracing a groove and that when the number C of waves of the G track address system is one and the number C of waves of the L track address system is three, the number of waves of the G track address system is adopted, thereby determining data "0".

Further, in the present embodiment, at the time of the data replacement at step S206 or S208 in FIG. 5, if the error bit to be replaced corresponds to a bit including opposite-phase wobbles, a reading error may be determined immediately without performing data replacement.

Specifically, as described above, because the address information obtained from the L track address system and the address information obtained from the G track address system differ from each other only by one bit and have the same values at other bits, it is possible to compare the address information obtained by demodulating the G track address system with the address information obtained by demodulating the L track address system and replace an error bit of the address information obtained from the G track address system by a corresponding bit of the address information obtained from the L track address system. However, such data replacement cannot be achieved when the position of the error bit of the address information obtained from the G track address system corresponds to the position of a bit of the L track address system which includes opposite-phase wobbles and provides undetermined data. Nevertheless, there is a possibility that data "0" or "1" can be read even at the bit position including opposite-phase wobbles depending on the conditions, in which case, the error bit is to be replaced by the bit of opposite-phase wobbles. In order to prevent this from occurring, when an error bit corresponds to a bit including opposite-phase wobbles, a reading error is immediately determined without performing data replacement.

More specifically, after the bit of the G track address system which has been determined as an error bit is replaced by the corresponding bit of the L track address system at step S206, the position of opposite-phase wobbles in the L track address system is determined from the track address thus obtained by replacement, and it is then determined whether or not the position of the bit which has replaced the error bit corresponds to this opposite-phase wobble position. In a case wherein the address of a groove track has been confirmed, it is easy to determine at which bit position in the L track address system in the groove track the opposite-phase wobbles are included. For example, if the groove track address has been confirmed as "00000011", it is possible to determine that the L track address system of that groove track includes the opposite-phase wobbles at the second bit for the following reason. Specifically, as the G track address system and the L track address system are both coded in gray code, when the G track address system is "00000011", the L track address systems of the land tracks adjacent to the G track on either side should be "00000001" and "00000011", respectively, which thus include opposite-phase wobbles at the second bit. In the example shown in FIG. 6, in which the bit which has replaced the error bit is the seventh bit and the position of opposite-phase wobbles is the second bit, the address which has been replaced can be adopted. If the bit which has replaced the error bit is the second bit, however, it means that the G track address has been replaced by a bit including opposite-phase wobbles, and therefore, in such a case, the address obtained by the bit replacement is not adopted and a reading error is determined. Generally, assuming that the address of a groove track obtained by replacing an error bit of the G track address system by a bit of the L track address system is m, the position of opposite-phase wobbles can be determined by m and m−1, which is the address immediately previous to m. However, there is a possibility that the address of a groove track obtained by replacing an error bit of the G track address system by a bit of the L track address system is m−1 (which is a case where while the address should originally be m, it becomes m−1 by bit replacement). In such a case, because the opposite-phase wobble position should originally be determined by m and m−1, the address n (=m−1) obtained by replacement and the address n+1 (=m) obtained by adding 1 to the address n are used to determine the position of opposite-phase wobbles. Thus, it can be considered that when the address after replacement is n, the position of opposite-phase wobbles can be determined by n and n±1. As a specific example, when the groove track address obtained by bit replacement is "00000011", the position of opposite-phase wobbles can be determined as the second bit from the address "00000001" which is immediately previous to the groove track address, and the position of opposite-phase wobbles can be determined as the least significant bit from the address "00000010" which is immediately after the groove track address. Consequently, the least significant bit and the second bit are determined as the opposite-phase wobble position. Accordingly, when either the least significant bit or the second bit has been replaced, the address obtained by the bit replacement is not adopted and a reading error is determined.

Similarly, at step S208, after the bit of the L track address system, which has been determined to be an error bit, is replaced by the corresponding bit of the G track address system, the position of opposite-phase wobbles in the G track address system is determined from the track address thus replaced, and it is then determined whether or not the position of the bit which has replaced the error bit corresponds to this opposite-phase wobble position. Generally, assuming that the address of a land track obtained by replacing an error bit of the L track address system by a bit of the G track address system is m, the position of opposite-phase wobbles can be determined by m and m+1, which is the address immediately after m. However, there is a possibility that the address of a land track obtained by replacing an error bit of the L track address system by a bit of the G track address system is m+1 (which is a case where while the address should originally be m, it becomes m+1 by bit replacement). In such a case, because the opposite-phase wobble position should originally be determined by m and m+1, the address n (=m+1) obtained by replacement and the address n−1 (=m) obtained by subtracting 1 from the address n are used to determine the position of opposite-phase wobbles. Thus, it can be considered that assuming the address after replacement is n, the position of opposite-phase wobbles can be determined by n and n±1. When it is determined that an error bit has been replaced by a bit including opposite-phase wobbles, the address after replacement is not adopted and a reading error is determined. Here, even when a plurality of bit positions are replaced and one of the replaced bits corresponds to the opposite-phase wobble position, it is still the case where the bit is replaced by opposite-phase wobbles. Therefore, in such a case, it is also desirable to determine a reading error without adopting the replaced address.

On the other hand, rather than determining the position of opposite-phase wobbles from the address which has been replaced as described above, it is also possible to estimate the position of opposite-phase wobbles before the data replacement and then determine whether or not the estimated position and the position of the error bit to be replaced correspond to each other. Specifically, when the address of the previous track has been confirmed due to verification of continuity of the track numbers or the like and therefore the target address can be confirmed from the previous track address, it is possible to estimate the position of opposite-phase wobbles from the target address in a manner similar to the method described above. For example, in groove track tracing, when the target address "00000011" has been confirmed, the position of opposite-phase wobbles of the L track address system in the groove track can be determined to be the second bit. Then, the address of the G track address system is actually read. If the second bit of the G track address system which is determined as an error bit, the second bit is not to be replaced and a reading error is determined; otherwise, the error bit at the second bit of the G track address system is to be replaced by opposite-phase wobbles. A similar process is applicable to the tracing of a land track. Because one track is formed by a plurality of segments as shown in FIG. 8, when the track address has been confirmed by the previous segment in the same track, the target address can be confirmed for the following segment.

As described above, when tracing a groove track, the position of opposite-phase wobbles of the L track address system is determined from the G track address system. This can be generalized as follows: when the G track address is n (binary data), the position of opposite-phase wobbles is determined by n and n−1, which is smaller than n by one. In land track tracing, when the L track address is n, the position of opposite-phase wobbles is determined by n and n+1, which is greater than n by one (see FIG. 6). Namely, when the track address has been confirmed as n (binary data), the position of opposite-phase wobbles can be determined from n and n±1.

While in the above examples, an optical disk device for recording or reproducing data with respect to grooves and lands formed in wobbles in which the address information is embedded has been described, the present invention is obviously similarly applicable to an optical disk device for recording or reproducing data with respect to grooves only formed in wobbles in which the address information is embedded. An optical disk device for recording or reproducing data with respect to just grooves only will be described.

In an optical disk device for recording or reproducing data with respect to only grooves, grooves of the optical disk are similarly formed in wobbles and the address information is embedded in these wobbles. In such a case, because it is not necessary to assign the address information to the lands, with regard to the lands, it is also not necessary to convert the address information into gray code for embedding. The address information is expressed using phase modulation in such a manner that four waves having a phase of 0 degrees represents "0" and four waves having a phase of 180 degrees represents "1". Here, one bit is expressed by four in-phase waves similar to the case of an optical disk for recording data on both grooves and lands in order that both types of disks can be driven by a single optical disk device. Here, an optical disk for recording data on grooves only is referred to "HD-DVD R" (write-once) and an optical disk for recording data on both grooves and lands is referred to as "HD-DVD RW" (rewritable). Then, the reason for representing one bit of the address data by four in-phase waves is to enable an optical disk device to drive both R and RW.

The address decoding circuit 28 detects the address and supplies the detected address to the system controller 32, and during tracing of a groove it is determined that a reading is successful only when four consecutive in-phase waves can be detected, and in all other cases it is determined that a reading error has occurred and a predetermined error process is performed. The counting circuit (see FIG. 2) of the address decoding circuit 28 counts the number C of in-phase waves during groove tracing and supplies the result to the system controller 32. When C=4 is input, the system controller 32 determines the bit value as "0". A result C=0, on the other hand, indicates that there are four waves having phases shifted by 180 degrees, and the system controller 32 determines the bit value as "1". In either case, the system controller 32 determines that reading has been performed correctly.

On the other hand, when the result of counting is C=1 or C=3, although the bit value can be determined to be "1" or "0", respectively, according to the principle of majority rule, reliability in this case is lowered. Accordingly, a reading error is determined by counting the number M of bits in the address information for which C=1 or C=3 is determined and determining whether or not the bit number M reaches a threshold value Mth. The threshold value Mth can be the same value as the threshold value Kth which is used when recording data on grooves and lands, and is set to 3 when the address information is represented in 12-bit gray code. Of course, Mth may be a different value than Kth. If M has not reached Mth yet, it is considered that reliability of the address information is secured and the bit value "1" or "0" is determined. More specifically, the bit value "1" is determined in the case of C=1, and the bit value "0" is determined in the case of C=3. If M reaches Mth, on the other hand, it is considered that reliability of the address information is low and therefore a reading error is determined. Alternatively, it is also possible to determine the bit value immediately according to the principle of majority rule, when the result of counting shows that C=1 or C=3.

On the other hand, when the counting result is C=2, in which case the bit value cannot be determined even according to the principle of majority rule, the system controller 32 determines a reading error.

When a reading error is determined, an arbitrary error process may be performed, including retry of reading, interruption of recording or reproducing, or correction of error, and so on. In the case of groove/land recording, because both the L track address system and the G track address system are formed in a groove, it is possible to perform error correction using information of the L track address system when a reading error is caused in the G track address system. In the case of recording on grooves only, however, because only the G track address system is provided in a groove, a method of error correction based on groove/land recording such as the above method cannot be adopted. However, if a predetermined error correction bit, such as a parity bit, is added in the G track address system, this bit can be used to perform error correction.

While the preferred embodiments of the present invention have been described using specific terms, such description is for illustrative purposes only, and it is to be understood that changes and variations may be made without departing from the spirit or scope of the appended claims.

What is claimed is:

1. An optical disk device for recording or reproducing data with respect to grooves and lands of an optical disk in which address information is embedded by forming the grooves and the lands in wobbles, the address information being embedded after conversion into a gray code in which a distance between codes for two consecutive address values is equal to 1, in which the wobbles form data of a single bit by N number of in-phase waves, the optical disk device comprising:
   means for reproducing the wobbles;
   means for counting the number of in-phase waves detected from the reproduced wobbles; and
   address determination means for confirming, when the number of in-phase waves of the wobbles is N/2+1 or greater, bit data in accordance with the phase and for determining a reading error and performing a predetermined error process when the number of in-phase waves of the wobbles is N/2.

2. An optical disk device for recording or reproducing data with respect to grooves and lands of an optical disk in which address information is embedded by forming the grooves and the lands in wobbles, the address information being embedded after conversion into a gray code in which a distance between codes for two consecutive address values is equal to 1, in which the wobbles form data of a single bit by N number of in-phase waves, the optical disk device comprising:
   means for reproducing the wobbles;
   means for counting the number of in-phase waves detected from the reproduced wobbles; and
   address determination means for confirming, when the number of in-phase waves of the wobbles is N, bit data in accordance with the phase and for determining a reading error and performing a predetermined error process when the number of in-phase waves of the wobbles is N−1 or less.

3. An optical disk device according to claim 2, wherein when the number of in-phase waves of the wobbles detected from the reproduced wobbles is N−1, the error process is performed such that whether or not at least the number of bit data in the address information for which N−1 is determined corresponds to a predetermined threshold value or greater is determined, and a reading error is determined when the number of such bit is the threshold value or greater, and bit data in accordance with the phase is confirmed when the number of such bit is less than the threshold value.

4. An optical disk device according to claim 1, wherein
the address information includes a parity bit, and
the error process is performed such that an error bit is corrected so that the parity bit is correct.

5. An optical disk device according to claim 2, wherein
the address information includes a parity bit, and
the error process is performed such that an error bit is corrected so that the parity bit is correct.

6. An optical disk device according to claim 1, wherein
the address information of the groove includes two address systems, which are a groove track address system defined by in-phase wobbles where the phase of the wobble on the inner radius side and the phase of the wobble on the outer radius side, forming the groove, are identical, and a land track address system defined by including opposite-phase wobbles where the phase of the wobble on the inner radius side and the phase of the wobble on the outer radius side, forming the groove, are reversed, and the address information of the lands includes two address systems, which are a land track address system defined by in-phase wobbles where the phase of the wobble on the inner radius side and the phase of the wobble on the outer radius side, forming the land, are identical, and a groove track address system defined by including opposite-phase wobbles where the phase of the wobble on the inner radius side and the phase of the wobble on the outer radius side, forming the land, are reversed, and
the error process is performed such that, when tracing the groove track, address information obtained from a wobble signal generated by reproducing the land track address system is used to correct an error, and when tracing the land track, address information obtained from a wobble signal generated by reproducing the groove track address system is used to correct an error.

7. An optical disk device according to claim 6, wherein
the error process is performed such that when generation of a reading error is determined in the address information obtained by reproducing the groove track address system at the time of tracing the groove track, the error bit is replaced by corresponding bit data of the address information obtained from the land track address system so as to correct the error, and when generation of a reading error is determined in the address information obtained by reproducing the land track address system at the time of tracing the land track, the error bit is replaced by corresponding bit data of the address information obtained from the groove track address system so as to correct the error.

8. An optical disk device according to claim 1, wherein N is 4.

9. An optical disk device according to claim 2, wherein N is 4.

10. An optical disk device according to claim 7, wherein
the address determination means determines that the process for error correction cannot be performed and confirms a reading error when, at the time of tracing the groove track, generation of a reading error is determined in the address information obtained by reproducing the groove track address system and the position of the error bit corresponds to the position of the opposite-phase wobbles in the land track address system.

11. An optical disk device according to claim 10, wherein the address determination means includes:
means for determining the position of the opposite-phase wobbles, when generation of a reading error is determined in the address information obtained by reproducing the groove track address system at the time of tracing the groove track, from an address obtained by replacing the error bit data by corresponding bit data of the address information obtained from the land track address system; and
means for determining a reading error of the address obtained by the bit data replacement when the position of the opposite-phase wobbles which is determined corresponds to the error bit position.

12. An optical disk device according to claim 10, wherein the address determination means includes:
means for determining the position of the opposite-phase wobbles from a target address when tracing the groove track; and
means for determining a reading error without performing the replacement when, at the time of tracing the groove track, generation of a reading error is determined in the address information, corresponding to the target address, obtained by reproducing the groove track address system, and the position of the error bit corresponds to the position of the opposite-phase wobbles.

13. An optical disk device according to claim 12, wherein the means for determining the position of opposite-phase wobbles determines the position of the opposite-phase wobbles from n and n-1, when the target address is n.

14. An optical disk device according to claim 7, wherein
the address determination means determines that the process for error correction cannot be performed and confirms a reading error when, at the time of tracing the land track, generation of a reading error is determined in the address information obtained by reproducing the land track address system and the position of the error bit corresponds to the position of the opposite-phase wobbles in the groove track address system.

15. An optical disk device according to claim 14, wherein the address determination means includes:
means for determining the position of the opposite-phase wobbles, when generation of a reading error is determined in the address information obtained by reproducing the land track address system at the time of tracing the land track, from an address obtained by replacing the error bit data by corresponding bit data of the address information obtained from the groove track address system; and
means for determining a reading error of the address obtained by the bit data replacement when the position of the opposite-phase wobbles which is determined corresponds to the error bit position.

16. An optical disk device according to claim 14, wherein the address determination means includes:
means for determining the position of the opposite-phase wobbles from a target address when tracing the land track; and
means for determining a reading error without performing the replacement when, at the time of tracing the land track, a reading error is determined in the address information obtained by reproducing the land track address system and the position of the error bit corresponds to the position of the opposite-phase wobbles.

17. An optical disk device according to claim 16, wherein the means for determining the position of opposite-phase wobbles determines the position of the opposite-phase wobbles from n and n+1, when the target address is n.

18. An optical disk device according to claim 11, wherein the means for determining the position of opposite-phase wobbles determines the position of the opposite-phase wobbles from n and n±1, when the target address is n.

19. An optical disk device according to claim 15, wherein the means for determining the position of opposite-phase wobbles determines the position of the opposite-phase wobbles from n and n±1, when the target address is n.

20. An optical disk device for recording or reproducing data with respect to grooves and lands of an optical disk in which address information is embedded by forming the grooves and the lands in wobbles, the address information being embedded after conversion into a gray code in which a distance between codes for two consecutive address values is equal to 1, in which the wobbles form data of a single bit by N number of in-phase waves, and the address information of the groove includes two address systems, which are a groove track address system defined by in-phase wobbles where the phase of the wobble on the inner radius side and the phase of the wobble on the outer radius side, forming the groove, are identical, and a land track address system defined by including opposite-phase wobbles where the phase of the wobble on the inner radius side and the phase of the wobble on the outer radius side, forming the groove, are reversed, and the address information of the lands includes two address systems, which are a land track address system defined by in-phase wobbles where the phase of the wobble on the inner radius side and the phase of the wobble on the outer radius side, forming the land, are identical, and a groove track address system defined by including opposite-phase wobbles where the phase of the wobble on the inner radius side and the phase of the wobble on the outer radius side, forming the land, are reversed, the optical disk device comprising:

means for reproducing wobbles of the groove track address system and the land track address system at the time of tracing the groove track or at the time of tracing the land track;

means for counting the number of in-phase waves of the wobbles of the groove track address system and the land track address system, which are detected from the reproduced wobbles; and address determination means for comparing the number of in-phase waves of the wobbles of the groove track address system and the land track address system for each bit and determining the bit for which the number of in-phase waves of the wobbles is greater as bit data of the address.

21. An optical disk device for recording or reproducing data with respect to grooves of an optical disk in which address information is embedded by forming the grooves in wobbles, in which the wobbles form data of a single bit by N number of in-phase waves, the optical disk device comprising:

means for reproducing the wobbles;

means for counting the number of in-phase waves of the wobbles detected from the reproduced wobbles; and address determination means for confirming, when the number of in-phase waves of the wobbles is N/2+1 or greater, bit data in accordance with the phase and for determining a reading error and performing a predetermined error process when the number of in-phase waves of the wobbles is N/2.

22. An optical disk device for recording or reproducing data with respect to grooves of an optical disk in which address information is embedded by forming the grooves in wobbles, in which the wobbles form data of a single bit by N number of in-phase waves, the optical disk device comprising:

means for reproducing the wobbles;

means for counting the number of in-phase waves of the wobbles detected from the reproduced wobbles; and address determination means for confirming, when the number of in-phase waves of the wobbles is N, bit data in accordance with the phase and for determining a reading error and performing a predetermined error process when the number of in-phase waves of the wobbles is N−1 or less.

23. An optical disk device according to claim 22, wherein when the number of in-phase waves of the wobbles detected from the reproduced wobbles is N−1, the error process is performed such that whether or not at least the number of bit data in address information for which N−1 is determined corresponds to a predetermined threshold value or greater is determined, and a reading error is determined when the number of such bit is the threshold value or greater and bit data in accordance with the phase is confirmed when the number of such bit is less than the threshold value.

* * * * *